Fig. 1

INVENTOR.
RAYMOND T. CLOUD
BY
ATTYS

Patented Mar. 25, 1952

2,590,755

UNITED STATES PATENT OFFICE 2,590,755

MAPPING DEVICE

Raymond T. Cloud, Houston, Tex., assignor to North American Geophysical Company, Houston, Tex., a corporation Application December 7, 1946, Serial No. 714,876

14 Claims. (Cl. 346—8)

This invention relates to a mapping device, and particularly to a device which may be carried by a moving object to map and record the path of movement of such object with respect to any system of fixed earth coordinates.

A mapping device embodying this invention is particularly useful for surveying or oil location crews in that the entire apparatus may be readily carried upon the same vehicle in which the crew travels and then the vehicle may be driven over the region which it is desired to survey and the entire attention of the crew may be devoted to obtaining altitude readings, gravity meter readings, or similar indications at spaced points along the path of the moving vehicle while the mapping device accurately records the path of the vehicle with respect to any desired system of fixed earth coordinates.

In mapping devices heretofore known, it has been customary to employ a movable tracing wheel or indicator which cooperates with a recording surface. The tracing wheel or indicator is then moved as a function of the speed and direction of the moving vehicle and hence records a reduced scale replica on the recording surface of the actual path traversed by the vehicle. Such known arrangements were unusually complicated due to the difficulty of providing suitable mechanical linkage for effecting the movement of the tracing wheel or indicator as a function of the actual movement of the vehicle with respect to ground surface.

It is a feature of this invention that an unusually simple and yet highly accurate mapping device may be produced by utilizing a stationary driving apparatus and producing movement of a platen or plate-like member by such stationary driving apparatus as an accurate function of the movement of the vehicle with respect to the ground. The movement of such platen may then be transmitted by a simple mechanical linkage to a tracing wheel or movable indicator to cooperate with a recording sheet.

Accordingly, it is an object of this invention to provide an improved device for mapping the path of a moving object.

A further object of this invention is to provide an improved mapping device wherein the velocity of movement of a moving object, as well as the direction of such movement, are accurately reproduced respectively in a rotational movement of a ball driving element which is located in a fixed position in the device, and wherein a plate is utilized as the driven element, which plate reproduces in reduced scale the movement of the moving object with respect to any desired system of fixed earth coordinates.

Another object of this invention is to provide an improved fixed position drive mechanism for a mapping device characterized by the incorporation of differential units which automatically compensate for errors inherent in the mechanism.

A particular object of this invention is to provide an improved recording table for cooperation with a movable indicator of a mapping device wherein such table is provided with reeling mechanism for supporting an elongated recording sheet and the table is angularly adjustable with respect to the movable indicator so as to permit the length axis of the recording sheet to be generally aligned with respect to the recording element in the same general direction as is expected that the object whose path is being recorded will travel.

The specific nature of this invention as well as other objects and advantages thereof will become apparent to those skilled in the art from the following detailed description of the annexed sheets of drawings which, by way of preferred example only, illustrate two specific embodiments of the invention.

While not limited thereto, a description of a preferred form of apparatus embodying this invention will proceed on the basis that such apparatus is mounted on a wheeled vehicle and is used for mapping the path of such vehicle with respect to ground. It will be recognized by those skilled in the art that apparatus embodying this invention may be readily applied to other types of vehicles and may also be utilized to plot the path of a vessel moving on water in conjunction with additional apparatus described and claimed in my copending application, Serial No. 710,608, filed November 18, 1946.

Figure 1:
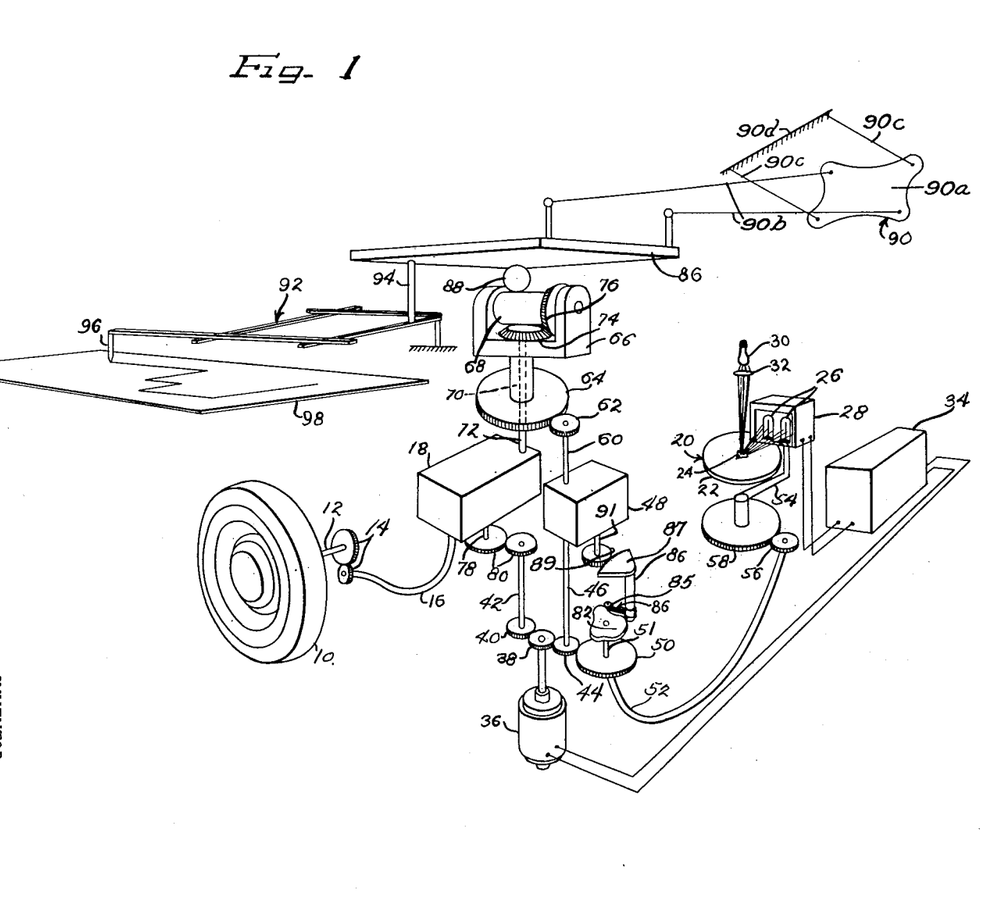
Fig. 1 is a schematic perspective view of an assembly of all apparatus utilized in a mapping device embodying this invention.

Referring to the schematic diagram of Fig. 1, numeral 10 indicates a wheel of a vehicle upon which the entire apparatus is carried. A pilot shaft 12 is driven by the wheel 10 and shaft 12 in turn drives a flexible shaft 16 through gearing 14. Flexible shaft 16 constitutes one of the input shafts for a differential unit 18. Hence, the rotation of flexible shaft 16 is a direct function of the speed of rotation of the vehicle wheel 10 and is a function of the velocity of the vehicle with respect to ground as well as the distance traversed by such vehicle along the ground.

To obtain an indication of the direction of movement of the vehicle, I preferably employ a magnetic compass device 20. It will be recognized by those skilled in the art that the movements of an ordinary compass needle must be greatly amplified to produce sufficient power for providing directional control of a mapping device. Such amplification may be conveniently provided by the utilization of a magnetized disc 22 as the compass needle element and the mounting on such disc 22 of a small, lightweight reflector 24. A pair of photocells 26 are mounted in a cage or housing 28 adjacent the periphery of the magnetic compass disc 22. The light beams from a light source 30 are focused by a lens 32 onto reflector 24 and are directed radially by reflector 24 to impinge upon the photocells 26.

The photocells 26 are electrically connected to an amplifier 34 to control the rotation of a servomotor 36. The shaft of servomotor 36 is connected through gears 38 and 40 to drive a compensating shaft 42 and through gears 38 and 44 to drive an input shaft 46 for a second differential unit 48. Gear 44 also drives a flexible shaft 52 through a gear 50 and shaft 52 rotates housing support arm 54 around compass disc 22 through gears 56 and 58. The photocell housing 28 is mounted on housing support arm 54.

The gearing connection between the housing support arm 54 and the servomotor 36 is selected so that servomotor 36 will always tend to rotate the housing support 54 to position the two photocells 26 so that they are equally illuminated by light reflected from the reflector 24 on the compass disc 22. It is, therefore, apparent that each time the vehicle changes its direction with respect to the earth's magnetic field, the compass disk 22 will shift its angular position with respect to the photocells 26 and the resulting controlled operation of servomotor 36 will not only shift the photocells 26 back to a position where they receive equal illumination from the reflector 24, but also, will produce an angular adjustment of the shafts 42 and 46.

The shaft 46 drives an output shaft 60 through the second differential unit 48. Output shaft 60 in turn carries a pinion 62 which is geared to a support gear 64. A bearing frame member 66 is suitably mounted on the support gear 64 so as to be rotatable therewith, preferably about a substantially vertical axis. Bearing frame member 66 journals a driving member 68, here shown as being of a roller configuration, for rotation about an axis substantially perpendicular to the axis of rotation of the bearing frame member. From the described construction it will be apparent that the angular position of the bearing frame 66, and hence the roller 68 about the vertical axis of rotation of the bearing frame 66 is controlled by the angular position of the servomotor 36 and hence, as a function of the direction of the earth's magnetic field at the particular location of the apparatus.

The bearing frame 66 is provided with a hollow portion 70 concentric with the axis of rotation of such bearing frame, and a drive shaft 72, constituting the output shaft of the first differential unit 18 passes through the hollow portion 70 and drives a bevel gear 74 which is disposed in underlying relationship to the roller 68. Bevel gear 74 cooperates with a second bevel gear 76 secured to roller 68 to rotate the roller 68 about its horizontal axis of rotation. It is, therefore, apparent that the rotation of roller 68 about its own axis is a function of the speed of rotation of vehicle wheel 10, and hence a function of the speed of movement or the distance traveled by the vehicle.

The first differential unit 18 is employed to eliminate the possibility of introduction of error in the rotation of the roller 68 about its own horizontal axis which may be produced by the rotation of the bearing frame 66 about its vertical axis. The second input shaft 78 for the differential unit 18 is geared to compensating shaft 42 by gears 80. The gearing ratios are selected so that any rotation of the roller 68 about its own axis produced by rotation of the bearing frame 66 about its axis, as determined by rotation of servomotor 36, is exactly compensated and eliminated by the effects of rotation of input shaft 78 on the differential unit 18.

The second differential unit 48 is utilized to compensate the apparatus for the varying errors in the compass reading around its 360° path of movement which are inherently found in any magnetic compass due to the presence of magnetic materials in the vicinity of such compass. It will be recognized by those skilled in the art that it is readily possible to accurately determine the deflection errors of the magnetic compass disk 22 as a function of its angular position. A cam 82 is then provided which is rotated by a shaft 51 on which the gear 50 is mounted. A peripheral cam track 84 is provided on cam 82 which is proportional to the errors in compass disk 22 and is rotatable synchronously with compass disk 22 by virtue of the gear connection therebetween.

A cam follower 85 is provided which is connected to a segment gear 87 and rotates such gear as a function of the cam track 84. Segment gear 87 in turn drives a shaft 91 through gear 89 and shaft 91 constitutes a second input shaft for the second differential unit 48. The rotation of shaft 91 therefor modifies the rotation of output shaft 60 to compensate for any errors existing in the deflection of compass disk 22 at any angular position in the 360° traverse of compass disk 22.

It is, therefore, apparent that the roller 68, which was also referred to as a driving member, rotates about its own horizontal axis at a rate which is an exact function of the speed of the vehicle with respect to ground and concurrently the roller 68 is rotated about the vertical axis of rotation of the roller frame 66 by an amount which is at all times an exact function of the direction of movement of the vehicle with respect to the earth's magnetic field. It should be particularly noted that even though the rotation and angular positioning of the roller of the driving member represents the two varying functions required for operating a mapping device, such driving member is nevertheless fixed in one spatial position with respect to the vehicle or other supporting structure upon which it is mounted.

To transmit the movements of the driving member 66 to a recording apparatus, I preferably employ a platen 86 which may conveniently constitute a rectangular steel plate. Platen 86 is disposed in a generally horizontal plane overlying the driving member or roller 68 and is suitably mounted for movement in a horizontal plane. To connect the roller or the driving member 68 with platen 86, I preferably employ a ball driving connection 88. The ball 88 is disposed between the bottom surface of the platen 86 and the peripheral surface of the driving member or roller 68. As a result, the platen 86 will be moved at a rate which is an accurate function of the speed of the vehicle with respect to ground and in a direction which is an accurate function of the direction of movement of the vehicle.

I preferably employ a parallelogram linkage mechanism 90 operating between the platen 86 and a fixed surface to prevent any tendency of the platen 86 to rotate but to freely permit bodily movement of the platen 86 in a horizontal plane. Such linkage comprises a plate 90a having a first pair of parallel, rigid links 90 pivotally connected thereto and to platen 86 and a second pair of parallel, rigid links 90c pivotally connected thereto and to a fixed support 90d.

While it is apparent that a tracing wheel, pencil, scriber or other form of indicator might be secured directly to the platen 86 and hence trace a reduced replica of the path of the vehicle on any suitable mapping surface, I preferably employ a pantograph linkage 92 which is suitably connected to the platen 86 as by a post 94 and which operates a suitable marking means, such as a pencil 96 as a function of the movement of the platen 86. A mapping surface 98 is provided to cooperate with the pencil 96 and the pencil 96 will trace thereon a reduced replica of the path of the vehicle with respect to ground. Such traced path may be readily oriented on existing maps of the region over which the vehicle is traveling by positioning the mapping surface at the beginning of the mapping operation in fixed orientation with respect to the earth's magnetic axis and locating the starting point of the mapping on such existing map.

The apparatus heretofore described has been shown only in schematic form. Referring now to Figures 2 through 6, there will be described a preferred form of driving mechanism and recording mechanism embodying the features of this invention. Similar numerals in these figures refer to equivalent components of Figure 1.

Figure 2:
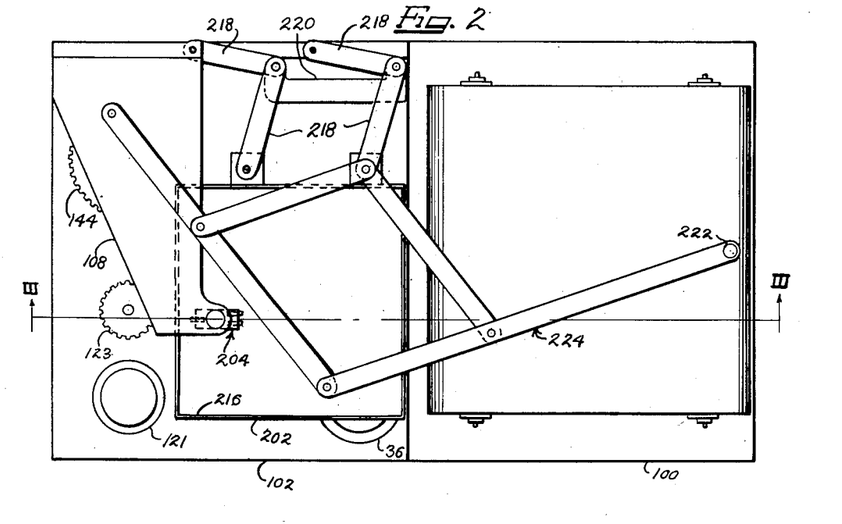
Fig. 2 is a top elevational view of driving mechanism and the recording elements of the apparatus of Fig. 1.
Figure 3:
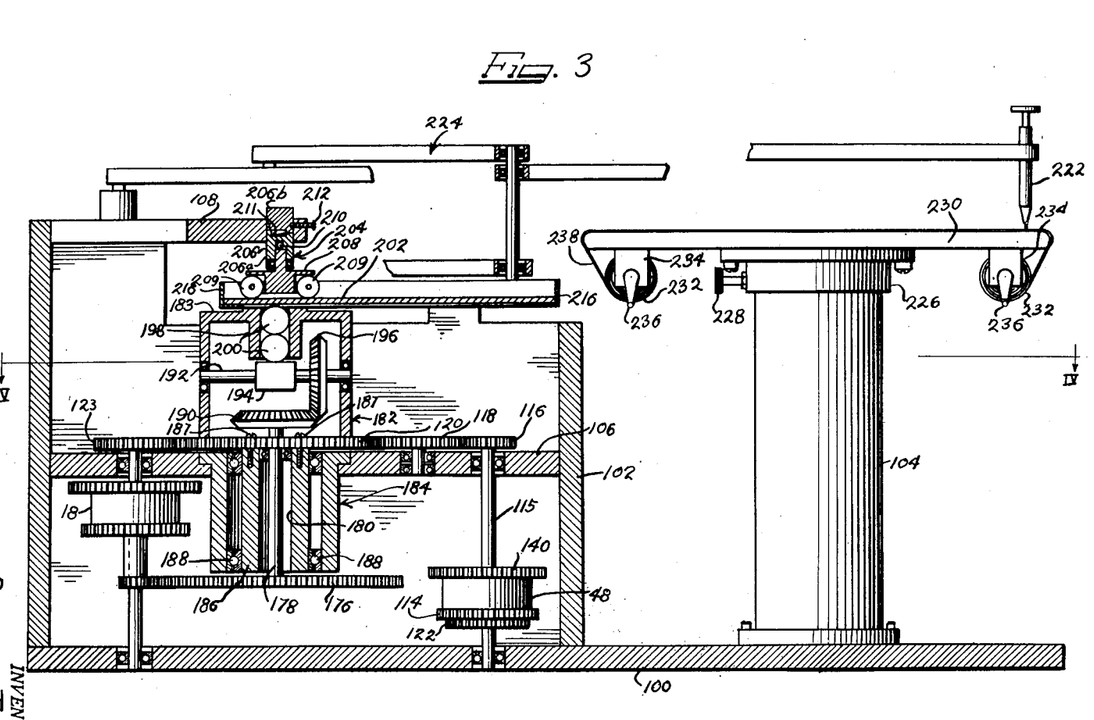
Fig. 3 is an enlarged scale, vertical sectional view taken along the plane III—III of Fig. 2.

Both the driving mechanism and the recording mechanism may be conveniently mounted in adjacent relationship on a base member 100. A housing 102 is mounted on base member 100 to support and enclose the elements of the driving mechanism while an upstanding column 104 is provided for the support of the recording mechanism.

Housing 102 is vertically divided by a horizontal wall 106 and a horizontal roof portion 108 is provided which partially overhangs horizontal wall 106. All of such fixed frame structure will hereafter be generally referred to as a support structure for the mapping device.

The elements of the magnetic compass device 20 are preferably mounted on the vehicle apart from the housing 102 so as to have minimum effect thereon by adjacent ferrous components.

The servomotor 36 is positioned in vertical relationship on the horizontal wall 106. The output shaft of servomotor 36 drives a gear 110 which through an idler gear 112 drives a first input gear 114 of the second differential unit 48. Differential unit 48 has an output shaft 115 extending vertically up through the horizontal wall 106. A second input gear 140 is provided for differential 48. The rotation of output shaft 115 is, of course, a joint function of the rotation of the input gears 114 and 140.

Figure 4:
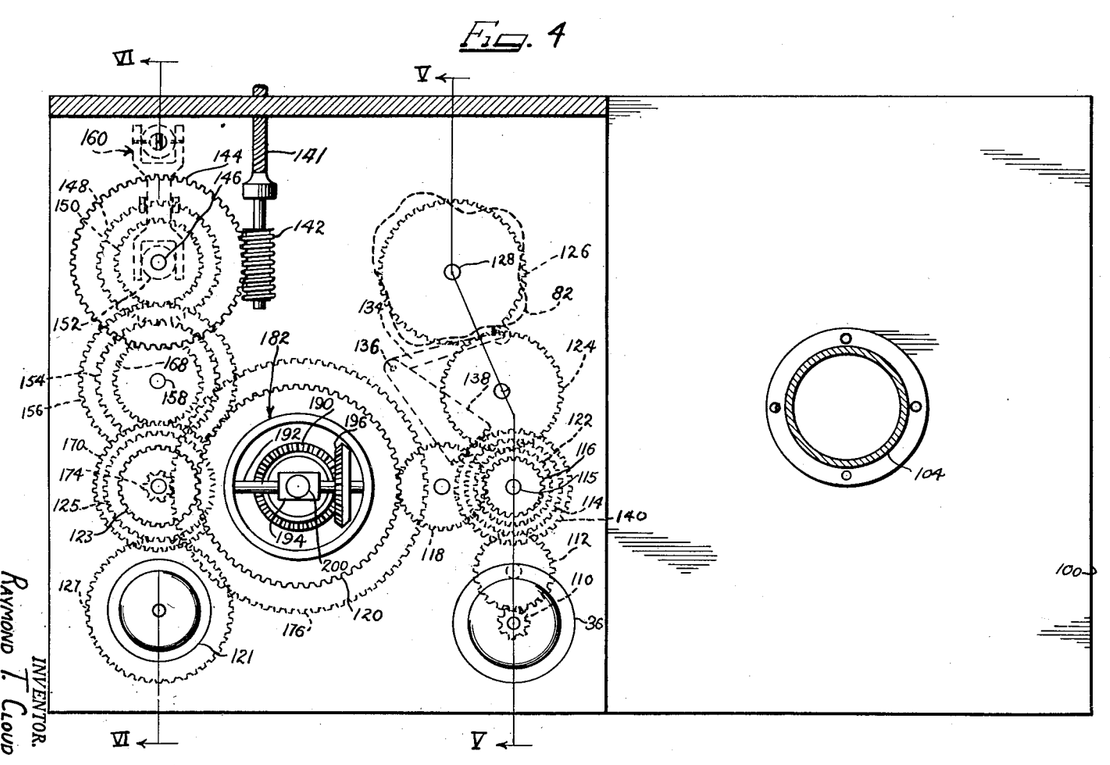
Fig. 4 is a horizontal sectional view taken along the plane IV—IV of Fig. 3.
Figure 5:
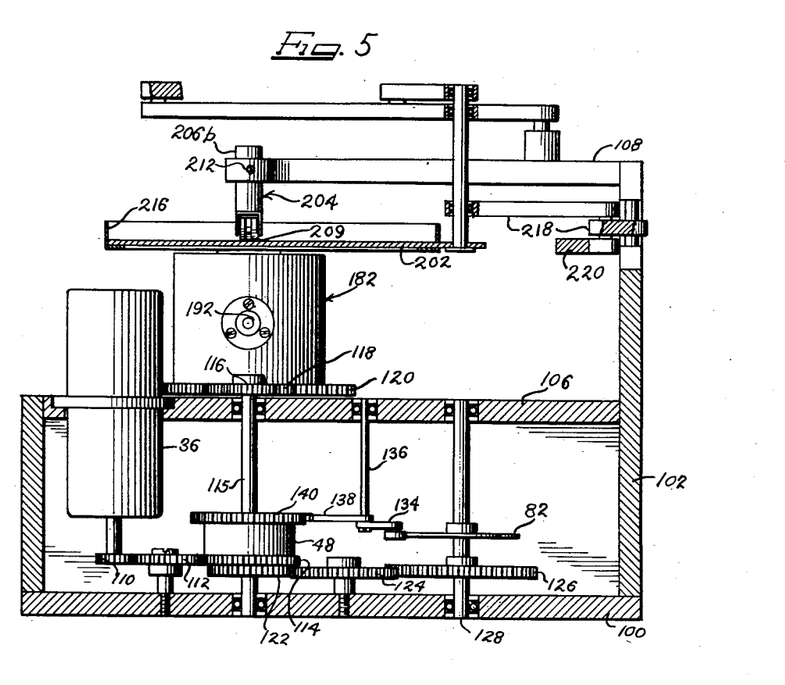
Fig. 5 is a vertical sectional view taken along the plane V—V of Fig. 4.
Figure 6:
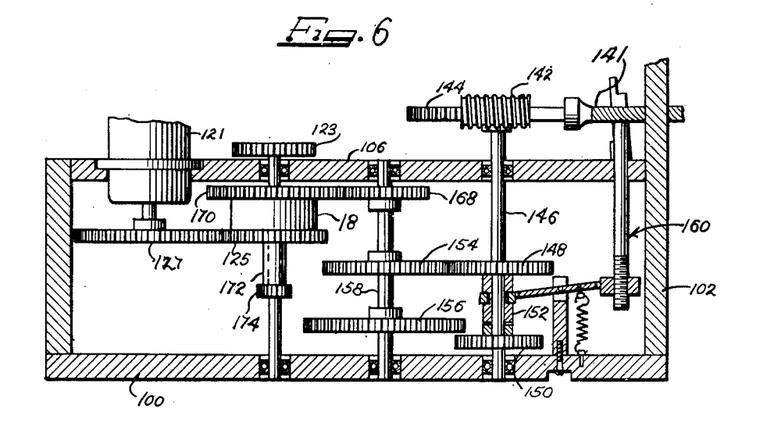
Fig. 6 is a partial vertical sectional view taken along the plane VI—VI of Fig. 4.

A gear 122 is provided which is co-rotatable with input gear 114 and drives an idler gear 124 which, in turn, drives a gear 126 mounted on a vertical shaft 128. Shaft 128 carries the cam plate 82. A vertical shaft 136 journaled in horizontal wall 106 carries a follower arm 134 which engages the periphery of cam plate 132 and effects a pivotal movement of a segment gear element 138 which is meshed with the second input gear 140 of the secondary differential unit 48.

The cam 82 performs identical functions to that of the cam 82 of the schematic diagram of Figure 1, namely, to introduce a compensation for compass errors through the medium of the secondary differential unit 48. As a result, the rotation of output shaft 115 will exactly indicate the direction of movement of the vehicle with respect to the earth's magnetic field.

On the top end of output shaft 115, above horizontal wall 106, a gear 116 is secured which drives an idler gear 118 which, in turn, drives a roller frame support gear 120.

While it is possible to control servomotor 36 directly from the photocell amplifier 34 in the manner indicated in the schematic diagram of Fig. 1, I prefer to employ a rotary transformer 121 to operate servomotor 36 as a function of the deflection of the compass disk. Transformer 121 (Fig. 6) may also be conveniently mounted in a vertical position in the horizontal wall 106 and is driven in synchronism with servomotor 36 by a gear 123 which meshes with the opposite side of bearing frame support gear 120. Gear 123 is co-rotatable with the gear 125 which, in turn, meshes with a gear 127 secured to rotary transformer 121. It is to be understood that rotary transformer 121 is provided with suitable electrical connections to the photocell amplifier 34 of Fig. 1 and, by virtue of its geared connection with servomotor 36, serves as a follow-up link for the servomotor drive in conventional fashion.

The rotational movement of a ground-engaging wheel of the vehicle is fed into the driving mechanism in any suitable fashion, such as by flexible speedometer cable 141. Flexible cable 141 is secured to a worm 142 which drives a worm-wheel 144 mounted upon a vertical shaft 146 journaled in the horizontal wall 106 and the bottom wall of the housing 102. The lower portion of shaft 146 is splined and receives a pair of unequal gears 148 and 150 thereon in axially spaced relationship. A shifter 152 is mounted between the gears 148 and 150 and serves to shift such gears to selectively engage gears 154 and 156 which are keyed to an adjacent vertical shaft 158. Gear shifter 152 is manually operated by any convenient gear shifting linkage 160. The selective engagement of gear 148 with gear 154 or gear 150 with gear 156 provides a selection of speed ratios for such gears which has the effect of permitting a selection of scale of the recorded path of the vehicle.

A pinion 168 is provided adjacent the top end of shaft 158 and drives an input gear 170 of the first differential unit 18. The second input gear for differential unit 18 is the gear 125 which, as has already been mentioned, is geared to the servomotor drive and hence rotates as a function of the angular position of the compass disk.

The output shaft of first differential unit 18 constitutes a downwardly extending sleeve 172 to which is secured a pinion 174. Pinion 174 is, in turn, meshed with a large gear 176 which is supported on the bottom of a drive shaft 178 which passes through an axial hollow portion 180 of a roller frame member 182.

Roller frame member 182 comprises a generally cylindrical housing which is suitably secured to the top surface of roller frame support gear 120. An annular bearing guide 184 is mounted in depending relationship in the horigontal wall 195 and a hollow cylindrical bearing portion 186 is secured by bolts 187 to the underside of roller frame support gear 120 and rotatably journaled in the bore of bearing guide 184 by suitable antifriction bearings 188. Roller frame 182 is thus rotatable about a vertical axis by roller frame support gear 120 and concurrently accommodates independent rotational movement of drive shaft 178 within the axial bore 180 of the depending bearing portion 186.

The top of drive shaft 178 projects above the top surface of roller frame support gear 120 and a bevel gear 190 is secured thereto. A shaft is journaled in the walls of bearing frame 182 about a substantially horizontal axis and carries a driving member or roller 194 and a bevel gear 196 which meshes with the bevel gear 190. Thus the roller 194 is rotated at a speed which is an accurate function of the speed of the vehicle with respect to ground and, furthermore, due to the differential unit 18, any adjustment of the angular position of roller frame 182 about its vertical axis will not produce erroneous rotation of the roller 194.

The roof portion 183 of roller frame 182 is provided with a central annular depending projection 198 which supports a pair of balls 200 which effect a driving connection between roller 194 and a platen 202.

The platen 202 which functionally corresponds to the platen 86 of the schematic diagram of Figure 1, comprises a plate-like member disposed in a generally horizontal plane and suitably mounted for bodily movements in such plane by resting on the ball connection 200. To provide a snug engagement between the platen 202 and the ball connections 200, a pressure head assembly 204 is provided which constitutes a generally inverted T-shaped member which has the stem portion 206 thereof mounted in a suitable aperture in the overhanging roof portion 108 of housing 102. A pair of rollers 209 are mounted in each end of the head portion 208 of the inverted T-shaped member 204 and rest upon the top surface of the platen 202. Any required amount of downward pressure may then be exerted upon the platen 202 by urging the pressure head 204 downwardly. The shank portion 206 of pressure head 204 has a telescopic connection with the head portion 208 and suitable antifriction thrust bearings 210 are provided therebetween to insure that the head portion 208 will freely swivel with respect to the shank portion 206, irrespective of the compressive forces existing therebetween. The shank portion 206 comprises an assemblage of axially abutting portions 206a and 206b, respectively.

The abutting surfaces of stem portions 206a and 206b are provided with peripheral cam surfaces 211. The top stem portion 206b is held against axial displacement in the roof portion 108 by a set screw 212 which engages an annular groove therein. Hence, rotation of the top stem portion 206b will, through the action of the co-operating cam surfaces 210, produce a downward thrust on the entire pressure head assembly and, hence, by tightening set screw 212 clamp the platen 202 snugly snugly between the ball 200 and the rollers 209.

The platen 202 is provided with a peripherally-extending upstanding rim portion 216 which co-operates with the pressure head 204 to insure that the platen will not be moved sufficiently by the ball connection 200 to move out of engagement therewith. Obviously, when the mapping of the vehicle's course has proceeded to such an extent that the platen 202 is moved to one extreme of its movement permitted by the rim 216, it is then necessary to release the pressure exerted by pressure head 204 by rotating the top stem portion 206b and reset the platen 202 with respect to the ball connection 200.

To eliminate any tendency of the platen 202 to rotate, and yet to permit unimpeded bodily movement of the platen 202 with respect to its supporting structure, a plurality of links 218 are provided. One pair of such links have their one end pivotally secured to the platen 202 at two spaced points thereon. The other ends of such links are pivotally secured to the ends of another pair of links. This latter pair of links have their other ends pivotally secured to the side wall of housing 102. A cross link connection 220 is provided which is pivotally mounted between the intermediate pivotal connection of the links 218. Hence, any tendency of the platen 202 to rotate is positively prevented by such links, yet unimpeded linear movement of the platen in any direction is permitted.

To transmit the motion of the platen 202 to a tracing wheel or other form of movable marking means, such, for example, as a pencil 222, any desired form of pantagraph linkage 224 may be employed. Hence, the movement of platen 202 may be conveniently amplified or reduced according to the requirements of the particular mapping device.

As was previously mentioned, the recording elements of the mapping device are supported upon a pedestal 104 which is of hollow cylindrical configuration. A mounting ring 226 is provided which is rotatably supported on the top of pedestal 104 and may be locked to pedestal 104 in any desired angular relationship with respect thereto as by a thumb screw 228. A recording table 230 is then suitably secured to support ring 226 and the top surface of such table is employed to support a mapping surface in cooperative relation to the recording pencil 222. Preferably, the table 230 is of rectangular configuration and a pair of reels 232 are supported in depending relationship to the underside of the table 230 and at opposed edges thereof by brackets 234. Cranks 236 may be provided for manually rolling the reels 232. The mapping surface preferably comprises an elongated sheet 238 of recording material, such as paper, which may be reeled onto both of the reels 232 and hence advanced across the top surface of table 230 by rolling the sheet 238 on one reel, while unrolling it from the other.

The fact that the angular position of the table 230 may be conveniently adjusted with respect to the recording pencil 224 is of particular advantage in the event that the vehicle path to be mapped lies in one general direction corresponding to either longitudinal or transverse movement, respectively, of the recording pencil 224 across the table 230. In such event the table 230 may be positioned with the direction of movement of the recording sheet 238 thereacross in general alignment with the expected general movement of the recording pencil 224. Under such conditions, a path of much greater length than the length of the table 230 may be continuously traced on the recording sheet 238, by the simple expedient of advancing such sheet the length of the table 230, each time that the recording pencil 224 reaches the extreme of its movement and then resetting the platen 202 so that the pencil 224 begins its next recording trace at exactly the point that it ended the preceding trace. The convenience of such method of operation will be readily appreciated by those skilled in the art.

The operation of the aforedescribed mapping device is deemed to be clear from the preceding description. Briefly, the servomotor 36 follows the deflections of the magnetic compass which are, of course, a function of the direction of movement of the vehicle with respect to the earth's magnetic axis. The movement of the servomotor 36 is transmitted to the roller frame 182 and produces an angular movement of such frame about its vertical axis. Concurrently, the speedometer shaft 140 produces a rotation of the roller 194 at a rate which is exactly proportional to the speed of the vehicle with respect to the ground the vehicle is traversing. The first differential unit 18 eliminates any possibility of errors being introduced into the rotation of roller 194 by the rotational movement of the roller frame 182. The second differential unit 48 automatically compensates for errors in the deflection of the magnetic compass which may be produced by virtue of the fact that such compass is mounted on a vehicle having magnetic materials which produce a variable effect on the deflection of such compass around its 360° traverse.

The resulting concurrent rotation of roller 194 and adjustment of its angular position is translated into linear movement of the platen 202 by virtue of the ball connections 200 therebetween. The movement of platen 202 is, in turn, translated to movement of the indicating pencil 224 by the pantograph linkage 222 therebetween. As a result, the pencil 224 will trace on the recording sheet 238 a path which is an exact, reduced scale replica of the path traversed by the vehicle. The scale of the path traced by the indicating pencil 224 may be changed by operation of gear shift linkage 160.

Figure 7:
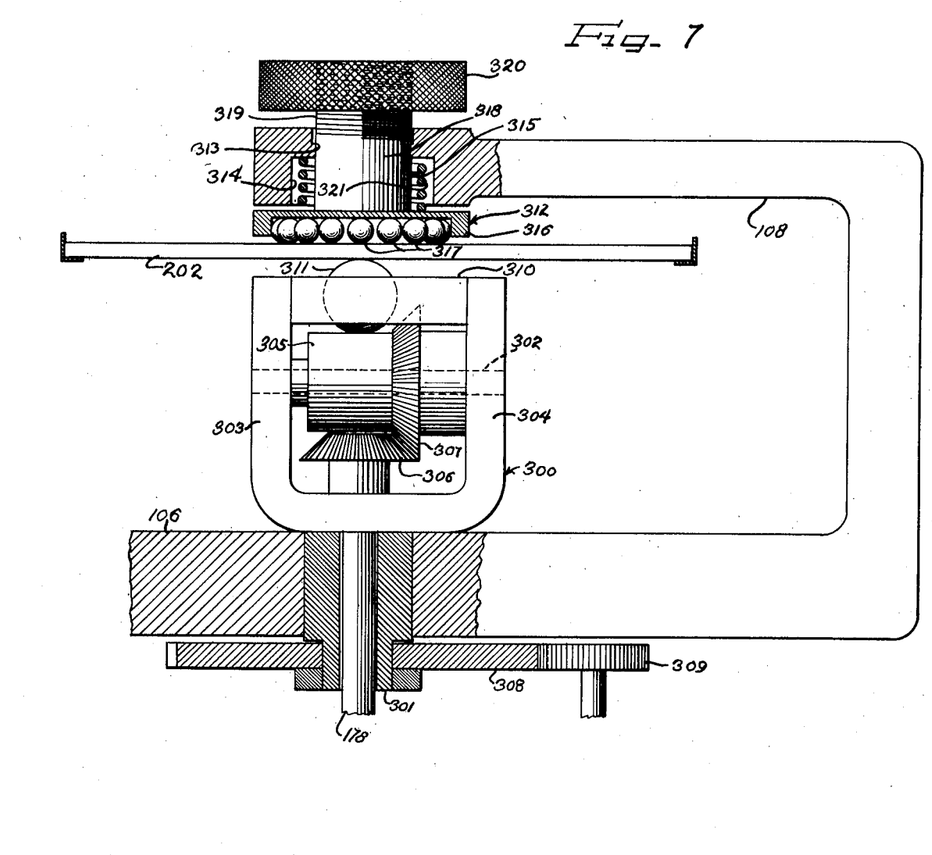
Fig. 7 is an elevational view, partly in section, of a modified form of driving head.

In Figure 7, there is disclosed a modified form of roller frame and pressure head which is of somewhat simpler construction than the modification heretofore described. The numeral 300 indicates generally the modified roller frame which comprises a yoke member having a hollow stem portion 301 journaled in a suitable vertical hole in horizontal wall portion 106 of the housing 102. The spaced arms 303 and 304 of the yoke 300 define horizontal bearings for a roller shaft 302. The axial bore of stem portion 301 accommodates the drive shaft 178. A roller 305 is mounted on shaft 302 and is driven by drive shaft 178 through the cooperation of bevel gears 306 and 307. The stem portion 301 of the yoke 303 projects downwardly through the horizontal wall portion 106 and a gear 308 is secured thereto. Gear 308 is driven by a gear 309 which, in turn, is driven through intermediate gear connections by the servomotor 36 heretofore described.

A transverse frame member 310 is mounted across the top end of the arms of yoke 300. Frame member 310 is provided with a suitable aperture therein to mount a ball 311 which provides a driving connection between the roller and the underside of the platen 202. The platen is urged downwardly into snug engagement with ball 311 by a pressure head assembly 312. The overhanging roof portion 108 is provided with a vertical hole 313 which is counterbored as indicated at 314 on its bottom face. A caster member 315 is provided having an inverted cup-shaped bottom portion 316 which confines a plurality of balls 317 in engagement with the top surface of the platen 202. Caster member 315 also has an upstanding shank portion 318 which is freely slidable in the aperture 313. A spring 321 is provided which is mounted in the counterbore 314 and operates between the base of such counterbore and the top surface of the caster base 316 to exert a downward pressure on the platen 202. The top end of shank portion 318 is provided with threads 319 and a thumb nut 320 is mounted thereon. In the normal operating position, thumb nut 320 is unscrewed on the threads 319 so that the caster plate assembly is free to move downwardly under the bias of spring 321. When it is desired to reset the platen 202, it is only necessary to screw down the thumb nut 320 which will compress the spring 319 and relieve the downward pressure on platen 202.

From the foregoing description, it is apparent that the modified form of driving mechanism illustrated in Figure 7 may be readily substituted for that heretofore described in connection with Figures 1 through 6. It will be understood that similar driving connections are provided for the modification of Figure 7 to concurrently produce a rotation of roller frame 300 which is a function of the speed of the vehicle whose path is being mapped and an angular displacement of such roller about a vertical axis which is a function of the direction of movement of the vehicle with respect to the earth's magnetic axis or any other suitable system of fixed earth coordinates.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a device for mapping the path of a moving object, a movable marker, means for moving said marker in a reduced scale path corresponding to the path of the moving object, an elongated recording sheet, means for supporting a portion of said sheet in cooperating relation with said marker, and angularly variable adjustment means on said support means to selectively vary the angular position of said supporting means with respect to said marker, whereby the length axis of said recording sheet may be maintained in general alignment with the expected general direction of movement of the object.

2. In a device for mapping the path of a moving object, a movable marker, means for moving said marker in a reduced scale path corresponding to the path of the moving object, an elongated recording sheet, a table having its surface disposed adjacent the moving marker, reel means on said table for supporting said recording sheet thereon with a portion of said sheet in cooperative relation with said marker to receive a trace therefrom, and support means for said table including relatively angularly movable elements to selectively vary the angular position of said table whereby the length axis of said sheet may be maintained in general alignment with the expected general direction of movement of the moving object.

3. In a device for mapping the course of a moving object, a support structure, a bearing frame rotatably mounted on said support structure, a driving member rotatably mounted in said frame about an axis perpendicular to the frame rotation axis, said driving member having an arcuate periphery concentric about said axis of rotation of said driving member, a platen movably mounted on said support structure, a ball driving connection concurrently engaging said platen and the arcuate surface of said driving member, means for rotating said driving member at a rate which is a function of the speed of the moving object, whereby said platen is moved relative to said support structure at a rate which is a function of the rate of rotation of said driving member, and means for controlling the angular position of said bearing frame as a function of the direction of the path of the moving object with respect to fixed earth coordinates, whereby said platen is moved in a direction which is a function of the angular position of said bearing frame with respect to said support structure.

4. The combination defined in claim 3 wherein said platen has the bottom face thereof supported on said ball connection and resilient means are provided urging said platen downwardly against said ball connection.

5. The combination defined in claim 3 wherein said platen comprises a plate having one face in pressed engagement with said ball connection, and means on said plate are provided for preventing bodily movement on said plate beyond engagement with said ball connection.

6. In a device for mapping the course of a moving object, a support structure, a bearing frame rotatably mounted on said support structure, a driving member rotatably mounted in said bearing frame about an axis perpendicular to the frame rotation axis, a platen movably mounted on said support structure, means operatively connecting said platen to said driving member, means for rotating said driving member as a function of the speed of the moving object including a differential unit, whereby said platen is moved relative to said support structure at a rate which is a function of the rate of rotation of said driving member, means for controlling the angular position of said bearing frame as a function of the instantaneous direction of the path of the moving object with respect to the fixed earth coordinates, whereby said platen is moved in a direction which is a function of the angular position of said bearing frame with respect to said support structure, and means connecting said last mentioned means and said differential unit, whereby rotation of said driving member about its own axis produced by rotation of said bearing frame about its axis is balanced out by said differential unit.

7. A device for mapping the course of a moving object comprising a support structure, a roller frame rotatably mounted on said support structure and having a hollow axial portion, a roller journaled in said roller frame about an axis perpendicular to said frame axis, a drive shaft extending through said hollow axial portion, gearing means connecting said drive shaft and said roller, a platen movably mounted on said support structure, a ball driving connection between said platen and said roller, means for rotating said drive shaft as a function of the speed of the moving object, whereby said platen is moved relative to said support structure at a rate which is a function of the rate of rotation of said driving shaft, and means controlling the angular position of said roller frame as a function of the direction of the path of the moving object with respect to fixed earth coordinates, whereby said platen is moved in a direction which is a function of the angular position of said bearing frame with respect to said support structure.

8. In a device for mapping the course of a moving object, a support structure, a roller frame rotatably mounted on said support structure and having a hollow axial portion, a roller journaled in said roller frame about an axis perpendicular to said frame axis, a drive shaft extending through said hollow axial portion, bearing means connecting said drive shaft and said roller, a platen movably mounted on said support structure, a ball driving connection between said platen and said roller, means for rotating said drive shaft as a function of the speed of the moving object including a differential unit, whereby said platen is moved relative to said support structure at a rate which is a function of the rate of rotation of said drive shaft, means for controlling the angular position of said roller frame as a function of the instantaneous direction of the path of the moving object with respect to fixed earth coordinates, whereby said platen is moved in a direction which is a function of the angular position of said bearing frame with respect to said support structure, and means connecting said last mentioned means and said differential unit, whereby rotation of said roller frame about its axis is produced by rotation of said bearing frame about its axis is balanced out by said differential unit.

9. In a device for mapping the course of a moving object, a support structure, a roller frame mounted on said support structure for rotation about a substantially vertical axis, a roller rotatably mounted on said roller frame about a substantially horizontal axis, a plate horizontally mounted on said support structure for generally horizontal movement overlying said roller, a ball driving connection between the bottom of said plate and the surface of said roller, means for rotating said roller at a rate which is a function of the speed of the moving object, whereby said plate is moved relative to said support structure at a rate which is a function of the rate of rotation of said roller, and means for controlling the angular position of said roller frame as a function of the direction of the path of the moving object with respect to fixed earth coordinates, whereby said plate is moved in a direction which is a function of the angular position of said roller frame with respect to said support structure.

10. In a device for mapping the course of a moving object, a support structure, a roller frame mounted on said support structure for rotation about a substantially vertical axis, a roller rotatably mounted in said roller frame about a substantially horizontal axis, a generally horizontal plate mounted on said support structure for horizonal movement overlying said roller, a ball driving connection between the bottom of said plate and the surface of said roller, means for rotating said roller at a rate which is a function of the speed of the moving object, whereby said plate is moved relative to said support structure at a rate which is a function of the rate of rotation of said roller, means for controlling the angular position of said roller frame as a function of the direction of the path of the moving object with respect to fixed earth coordinates, whereby said plate is moved in a direction which is a function of the angular position of said roller frame with respect to said support structure, a mapping surface, marker disposed in cooperative relation to said mapping surface and relatively movable with respect thereto, and linkage means connecting said plate and said marker for producing relative movement of said marker with respect to said mapping surface.

11. The combination defined in claim 10 plus linkage means for preventing rotation of said plate but permitting unimpeded bodily movement of said plate in a horizontal plane with respect to said support structure.

12. In a device for mapping the course of a moving, wheel-supported vehicle, a support structure adapted to be mounted on the vehicle, a roller frame mounted on said support structure for rotation about a substantially vertical axis, a roller mounted on said roller frame for rotation about a substantially horizontal axis, a generally horizontal plate movably mounted on said support structure in overlying relationship to said roller for movement in a substantially horizontal plane, a ball driving connection between said plate and the surface of said roller, means operable by a wheel of the vehicle for rotating said roller as a function of speed of the moving vehicle, whereby said plate is moved relative to said support structure at a rate which is a function of the speed of the vehicle, and compass means for controlling the angular position of said roller frame with respect to said support structure as a function of the direction of movement of the vehicle with respect to the earth's magnetic axis, whereby said plate is moved in a direction which is a function of the direction of of movement of the vehicle.

13. The combination defined in claim 12 plus a mapping surface adapted to be carried on the moving vehicle, a marker disposed in cooperative relation to said mapping surface and relatively movable with respect thereto, and linkage means connecting said plate and said marker for producing relative movement of said marker with respect to said mapping surface, thereby reproducing the path of the moving vehicle on said mapping surface.

14. In a device for mapping the course of a moving object, a support structure, a bearing frame rotatably mounted on said support structure, a driving member rotatably mounted in said bearing frame about an axis perpendicular to the frame rotation axis, a platen movably mounted on said support structure, a ball connection between said platen and said driving member, means for rotating said driving member as a function of the speed of the moving object, whereby said platen is moved relative to said support structure at a rate which is a function of the rate of rotation of said driving member, means for controlling the angular position of said bearing frame as a function of the direction of the path of the moving object with respect to the fixed earth coordinates, whereby said platen is moved in a direction which is a function of the angular position of said bearing frame with respect to said support structure, said platen comprising a plate having one face engaged by said ball connection and resilient means urging said plate against said ball connection.

RAYMOND T. CLOUD.

REFERENCES CITED

The following references are of record in the file of this patent:

UNITED STATES PATENTS

| Number | Name | Date |
|---|---|---|
| 1,701,582 | Mengden | Feb. 12, 1929 |
| 1,746,420 | Fung | Feb. 11, 1930 |
| 2,178,306 | Lauck | Oct. 30, 1939 |
| 2,179,663 | Link, Jr. | Nov. 14, 1939 |
| 2,369,922 | Shamah | Feb. 20, 1945 |
| 2,390,613 | Oliphant | Dec. 11, 1945 |